US010215371B1

(12) United States Patent
Lehman et al.

(10) Patent No.: US 10,215,371 B1
(45) Date of Patent: Feb. 26, 2019

(54) OUTDOOR LIGHTING FIXTURE

(71) Applicant: Cooper Technologies Company, Houston, TX (US)

(72) Inventors: Gregg Arthur Lehman, Peachtree City, GA (US); Sridhar Reddy Nimma, Cumming, GA (US)

(73) Assignee: Cooper Technologies Company, Houston, TX (US)

( * ) Notice: Subject to any disclaimer, the term of this patent is extended or adjusted under 35 U.S.C. 154(b) by 530 days.

(21) Appl. No.: 14/918,006

(22) Filed: Oct. 20, 2015

Related U.S. Application Data

(63) Continuation of application No. 13/464,528, filed on May 4, 2012, now Pat. No. 9,163,808.

(51) Int. Cl.

| | |
|---|---|
| ***B60Q 1/06*** | (2006.01) |
| ***F21V 29/00*** | (2015.01) |
| ***B60Q 3/04*** | (2006.01) |
| ***F21V 15/00*** | (2015.01) |
| ***F21V 17/00*** | (2006.01) |
| ***F21L 4/00*** | (2006.01) |

(Continued)

(52) U.S. Cl.

CPC .......... *F21V 15/015* (2013.01); *F21V 29/507* (2015.01); *F21V 29/763* (2015.01); *F21V 29/83* (2015.01); *F21V 31/005* (2013.01); *F21V 31/03* (2013.01); *F21W 2131/103* (2013.01); *F21Y 2101/02* (2013.01); *F21Y 2105/001* (2013.01)

(58) Field of Classification Search

CPC .... F21V 15/015; F21V 29/507; F21V 29/763; F21V 29/83; F21V 31/03; F21V 31/005; F21W 2131/103; F21Y 2105/10; F21Y 2115/10

USPC .... 362/373, 294, 264, 218, 547, 217.1, 800, 362/153.1, 152; 361/679.46, 679.55, 361/701–704, 707–713, 679.01, 690, 692, 361/693; 413/58–68; 285/335–380

See application file for complete search history.

(56) References Cited

U.S. PATENT DOCUMENTS 4,028,541 A 6/1977 Franklin
4,538,217 A 8/1985 Ewing (Continued)

OTHER PUBLICATIONS

Cree, STR-SLM-3M-HT, LEDway SLM Streetlight, Product Specification Sheet, Jan. 5, 2012.

(Continued)

*Primary Examiner* — Erin Kryukova
(74) *Attorney, Agent, or Firm* — King & Spalding LLP

(57) ABSTRACT

A outdoor lighting fixture includes an enclosure, a heatsink, and an end-cap. The enclosure includes a cabinet and a cover that enclose control and power circuitry to provide power to illuminate a light source. The cabinet further includes an attachment face, and the extruded heatsink can be coupled to the attachment face. The extruded heatsink includes sides, a discontinuous plane of material formed with sides of the heatsink to provide a recessed mounting tray, and heat-conducting fins extending from the plane of material. The light source, which can include an LED light source, is coupled to the heatsink. The extruded heatsink can be coupled at one end to the attachment face of the cabinet at a position such that a space remains between the plane of material and a bottom edge of the attachment face, to permit water to drain from between the heat-conducting fins of the extruded heatsink.

19 Claims, 10 Drawing Sheets

(51) Int. Cl.

| | |
|---|---|
| ***F21V 25/00*** | (2006.01) |
| ***F21V 15/015*** | (2006.01) |
| ***F21V 29/507*** | (2015.01) |
| ***F21V 29/76*** | (2015.01) |
| ***F21V 29/83*** | (2015.01) |
| ***F21V 31/00*** | (2006.01) |
| ***F21V 31/03*** | (2006.01) |
| *F21W 131/103* | (2006.01) |
| *F21Y 101/02* | (2006.01) |
| *F21Y 105/00* | (2016.01) |

(56) References Cited

U.S. PATENT DOCUMENTS

| | | | | |
|---|---|---|---|---|
| 5,172,976 | A | 12/1992 | Bogdanovs | |
| 5,615,947 | A | 4/1997 | Shambo et al. | |
| 5,741,064 | A | 4/1998 | Chin et al. | |
| 5,803,590 | A | 9/1998 | Wedell | |
| 5,997,158 | A | 12/1999 | Fischer | |
| 6,425,681 | B1 | 7/2002 | Agabekov | |
| 6,652,117 | B2 | 11/2003 | Tsai | |
| 7,028,629 | B2 | 4/2006 | Walcome | |
| 7,611,264 | B1 | 11/2009 | Chang et al. | |
| 7,674,005 | B2 | 3/2010 | Chung et al. | |
| 7,771,087 | B2 | 8/2010 | Wilcox et al. | |
| 7,837,362 | B2 | 11/2010 | Zhang | |
| 7,909,489 | B2 | 3/2011 | Lin et al. | |
| 7,967,469 | B2 | 6/2011 | Fang et al. | |
| D646,419 | S | 10/2011 | Chiang et al. | |
| 8,092,049 | B2 | 1/2012 | Kinnune et al. | |
| 8,235,555 | B2 | 8/2012 | Thomas et al. | |
| 8,267,544 | B2 * | 9/2012 | Zheng | F21S 2/005 362/249.02 |
| 8,313,222 | B2 | 11/2012 | Kinnune et al. | |
| 8,360,613 | B2 | 1/2013 | Little, Jr. | |
| 8,585,258 | B2 | 11/2013 | Ham | |
| 8,616,730 | B2 | 12/2013 | Edwards et al. | |
| 8,845,116 | B2 | 9/2014 | Kim et al. | |
| 9,879,849 | B2 * | 1/2018 | Kinnune | F21V 29/004 |
| 2005/0128752 | A1 | 6/2005 | Ewington et al. | |
| 2006/0181883 | A1 | 8/2006 | Hsu | |
| 2007/0064427 | A1 | 3/2007 | Sibalich et al. | |
| 2008/0037239 | A1 | 2/2008 | Thomas et al. | |
| 2008/0080196 | A1 | 4/2008 | Ruud et al. | |
| 2009/0251898 | A1 | 10/2009 | Kinnune et al. | |
| 2010/0027269 | A1 | 2/2010 | Lo et al. | |
| 2010/0039831 | A1 | 2/2010 | Liu et al. | |
| 2010/0079991 | A1 * | 4/2010 | Zhang | F21V 15/01 362/235 |
| 2010/0134046 | A1 | 6/2010 | Holder et al. | |
| 2010/0254140 | A1 | 10/2010 | Wen et al. | |
| 2010/0302790 | A1 | 12/2010 | Yen | |
| 2011/0013402 | A1 | 1/2011 | Little, Jr. | |
| 2011/0060701 | A1 | 3/2011 | Verfuerth et al. | |
| 2011/0063832 | A1 | 3/2011 | Hu et al. | |
| 2011/0210676 | A1 | 9/2011 | Beghelli | |
| 2011/0222284 | A1 | 9/2011 | Kong et al. | |
| 2011/0266282 | A1 | 11/2011 | Chu | |
| 2012/0008331 | A1 | 1/2012 | Marquardt et al. | |
| 2012/0087118 | A1 | 4/2012 | Bailey et al. | |
| 2012/0092879 | A1 | 4/2012 | Chang | |
| 2012/0140433 | A1 | 6/2012 | Armer et al. | |
| 2012/0162980 | A1 | 6/2012 | Mrakovich | |
| 2012/0275162 | A1 | 11/2012 | Spiro | |
| 2012/0327641 | A1 | 12/2012 | Holder et al. | |
| 2013/0088864 | A1 * | 4/2013 | Verdes | F21V 29/004 362/235 |
| 2013/0148360 | A1 | 6/2013 | Jeon et al. | |
| 2013/0242574 | A1 * | 9/2013 | Guercio | F21V 23/008 362/373 |

OTHER PUBLICATIONS

Cree, STR-SLM66-2MB-HV, IP66 LEDway SLM Streetlight, Product Specification Sheet, Nov. 7, 2011.
Ruud Lighting, STR-LWY-IS-AA, IP66 LEDway SLM Streetlight, Type 1 Short, Product Specification Sheet, Aug. 11, 2011.
Cree, XSPI Series LED Street Light, Product Specification Sheet, Apr. 10, 2012.

* cited by examiner

OUTDOOR LIGHTING FIXTURE

CROSS-REFERENCE TO RELATED APPLICATIONS

This patent application is a continuation of and claims priority under 35 U.S.C. § 120 to U.S. patent application Ser. No. 13/464,528, entitled "Outdoor Lighting Fixture," filed May 4, 2012, the entire contents of which are hereby incorporated herein by reference.

TECHNICAL FIELD

The present disclosure generally relates to aspects of lighting fixtures and, particularly, lighting fixtures used in outdoor lighting applications that incorporate light emitting diode (LED) light sources.

BACKGROUND

Outdoor lighting fixtures such as those commonly referred to as roadway lighting fixtures are commonly used to illuminate streets, highways, and parking lots, among other areas. These roadway fixtures typically include different types of lighting elements such as fluorescent, halogen, or incandescent lights. Beyond consuming a significant amount of power, these roadway fixtures require routine maintenance as light sources generally have only a limited lifetime of operation before burning out. Some new roadway fixtures utilize LED light sources. These roadway fixtures consume lower power and have lower operating expenses because the LED light sources have a significantly longer operating lifetime.

Particularly, with the longer operating lifetimes of the LED light sources, maintenance is required more sparingly to replace the LED light sources, as compared to other light sources. Further, the lower power consumption of the LED light sources leads to lower utility costs. These and other aspects have led to adoption of LED light sources in new roadway lighting fixtures. However, because of differences between the operating characteristics of the LED light sources and the fluorescent, halogen, or incandescent light sources, for example, many features of lighting fixtures that incorporate the LEDs must be redesigned. In this context, new lighting fixtures incorporating design characteristics particularly suited for LED light sources are necessary.

SUMMARY

In one embodiment, a roadway lighting fixture is described. The lighting fixture includes an enclosure including a cabinet including an attachment face on a first side, a cabinet, and a cover. Together, the cabinet and the cover enclose control and power circuitry to provide power to illuminate a light source. An heatsink can be mounted to the attachment face of the enclosure. Generally, the heatsink is provided to conduct heat away from the light source, when the light source is mounted to the heat sink.

In certain aspects, the heatsink includes at least a first side and a second side, a discontinuous plane of material integrally formed with the sides to provide a substantially planar mounting tray recessed with respect to a dimension of the sides, and a plurality of heat-conducting fins extending from a first side of the substantially planar mounting tray. The heatsink can also include an elongated center channel that guides wires and one or more elongated mounting eye openings that can be used to mount the light source to the heatsink. In certain embodiments, the light source can include an LED light source mounted to a side of the plane of material of the heatsink.

When the heatsink is coupled to the attachment face of the cabinet, the heatsink is coupled at a position such that a lateral space remains between the substantially planar mounting tray and a bottom edge of the attachment face. The space permits water and air to flow between the heat-conducting fins and drain to the ground.

In certain embodiments, the lighting fixture further includes a gasket is positioned between the attachment face and the heatsink, when the heatsink is coupled to the attachment face. In certain other embodiments, the lighting fixture includes a gasket and a gasket plate positioned between the attachment face and the heatsink, when the heatsink is coupled to the attachment face. The gasket and the gasket place can each include mounting hole openings, through hole openings, a wiring pass-through opening, and a plurality of drainage openings.

In another embodiment, a lighting fixture including a housing is described. The housing includes a plurality of sides defining an enclosure and an attachment face on one of the plurality of sides. In certain aspects, a plurality of electrical components are disposed within the enclosure.

In other aspects, the lighting fixture further includes a heatsink coupled to the attachment face. The heatsink includes at least a first side and opposing second side, a substantially planar mounting tray disposed between the first and second sides and integrally formed with the first and second sides. In certain aspects, the heatsink is disposed such that a top surface of the mounting tray is vertically offset below a bottom surface of the attachment face.

Further, in certain embodiments, a gasket is coupled to and at least partially disposed between the attachment face and the heatsink. Additionally, a gasket plate can be coupled to the attachment face and at least partially disposed between the gasket and the attachment face.

These and other aspects, objects, features, and embodiments will become apparent to a person of ordinary skill in the art upon consideration of the following detailed description of illustrative embodiments exemplifying the best mode as presently perceived.

BRIEF DESCRIPTION OF THE DRAWINGS

For a more complete understanding of the exemplary embodiments and the advantages thereof, reference is now made to the following description, in conjunction with the accompanying figures briefly described as follows.

Figure 1:
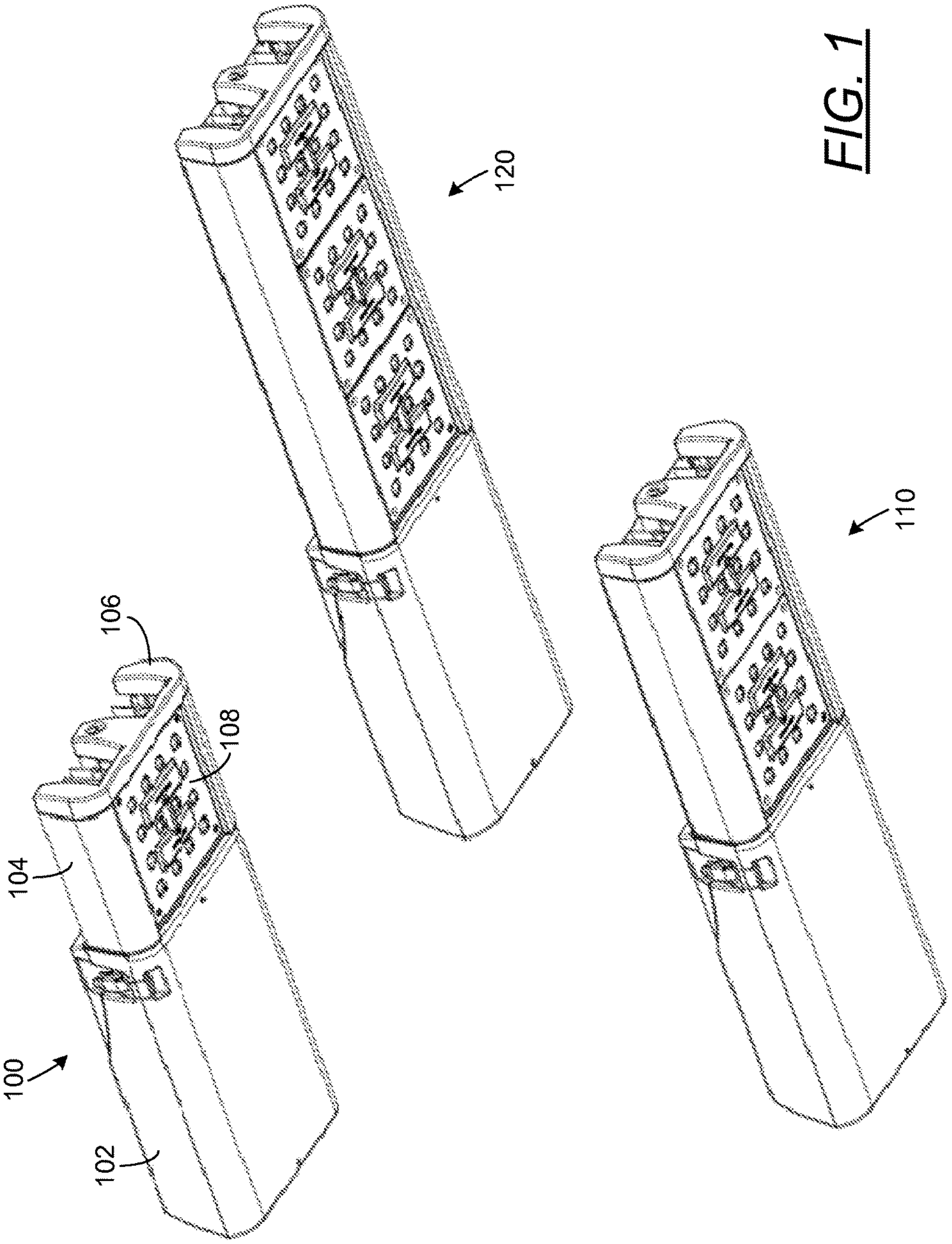
FIG. 1 provides a perspective view of outdoor lighting fixtures in accordance with exemplary embodiments.

The drawings illustrate only exemplary embodiments and are therefore not to be considered limiting of its scope, as other equally effective embodiments are within the scope and spirit of this disclosure. The elements and features shown in the drawings are not necessarily drawn to scale, emphasis instead being placed upon clearly illustrating the principles of the exemplary embodiments. Additionally, certain dimensions or positionings may be exaggerated to help visually convey such principles. In the drawings, reference numerals designate like or corresponding, but not necessarily identical, elements.

DETAILED DESCRIPTION

In the following paragraphs, the exemplary embodiments are described in further detail by way of example with reference to the attached drawings. In the description, well-known components, methods, and/or processing techniques are omitted or briefly described so as not to obscure the embodiments. As used herein, the "present invention" refers to any one of the embodiments of the invention described herein and any equivalents. Furthermore, reference to various feature(s) of the "present invention" is not to suggest that all embodiments must include the referenced feature(s).

Turning now to the drawings, in which like numerals indicate like, but not necessarily the same or identical, elements throughout, exemplary embodiments of the invention are described in detail. FIG. 1 provides a perspective view of lighting fixtures in accordance with certain exemplary embodiments. Referring now to FIG. 1, three fixtures 100, 110, and 120 are illustrated. In certain exemplary applications, the fixtures 100, 110, and 120 are suitable as outdoor lighting fixtures for illuminating roadways, parking lots, or parking garages (generally, referred to herein as "roadway fixtures"), for example, without limitation. The fixture 100 includes an enclosure 102, an extruded heatsink 104, a light source 108, and an end-cap 106. In various embodiments, certain fixtures can include a plurality of light sources 108. Particularly, the fixture 100 includes one light source 108, while the fixture 110 includes two, and the fixture 120 includes three.

In the exemplary embodiments of FIG. 1, the exemplary light sources 108 are rectangular or square light modules having an array of LEDs disposed on a substrate, in one case a circuit board, and can be generally referred to as light bars or light squares. The light sources 108 include a cover panel positioned over the circuit board and individual optics or lenses disposed over each LED or group of LEDs in the array and having at least a portion positioned between the cover plate and the circuit board. The cover panel can be transparent, translucent, or opaque. Alternatively, the cover panel is manufactured from acrylic or some other plastic and the optics are integrally formed with the cover plate. The cover plate can be metal or die cast with apertures that align with the optics.

As shown in FIG. 1, the exemplary light source 108 includes a plurality of light emitting diodes (LEDs) mounted to a square substrate. Each of the LEDs includes semiconductive material that is treated to create a positive-negative (p-n) junction. When the LEDs are electrically coupled to a power source, such as an LED driver, current flows through the junction, causing charge carriers to release energy in the form of incoherent light. In alternative embodiments, the light source 108 may include light sources other than LEDs, such as organic light emitting diodes (OLEDs), incandescent or miniature incandescent bulbs, compact florescent lights (CFLs), or other known light sources or combinations thereof.

The square substrate of the light source 108 can be mounted to the extruded heatsink 104 in various embodiments using screws, bolts, clips, tabs, adhesives, or other suitable mechanical fastening means. An exemplary means for mounting the light source 108 to the extruded heatsink 104 is described below with reference to FIGS. 8 and 9. The extruded heatsink 104 is in thermal communication with the light source 108 to receive heat emitted from the light source 108 via conduction and disperses the heat, such as by both conduction and convection, to maintain a long operating lifetime of the light source 108. One end of the extruded heatsink 104 is mounted to an attachment face of the enclosure 102, as described in further detail below. Further, the end-cap 106 is mounted to another end of the extruded heatsink 104, as illustrated in FIG. 1 and described in further detail below. In various embodiments, the enclosure 102 houses control and power circuitry to convert power from an external source into power suitable to illuminate the light source 108, based on the operating requirements of the light source 108. As such, in various embodiments, the enclosure 102 houses transformers, power supplies, batteries or super-capacitors, LED driver and control circuitry, photocells, motion sensors, timers, and transceivers for wireless or RF communication, among other elements, for providing power and control signals to illuminate the light source (or sources) 108. Generally, the lighting fixtures 100, 110, and 120 are connected to an external power source such as a power utility grid or other power distribution system.

Although the bulk of the additional discussion below is provided with reference to the lighting fixture 100, it should be appreciated that the features described below may be attributed or incorporated into various embodiments of the lighting fixtures 110 and 120, as would be understood by one having ordinary skill in the art.

Figure 2A:
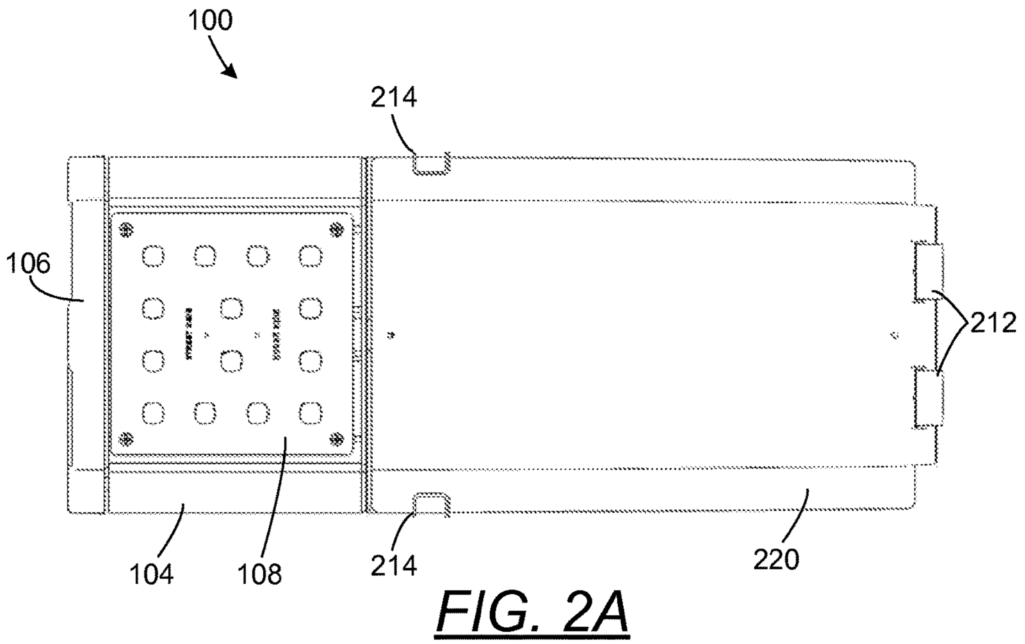
FIG. 2A provides a plan view of an outdoor lighting fixture in accordance with one exemplary embodiment.
Figure 2B:
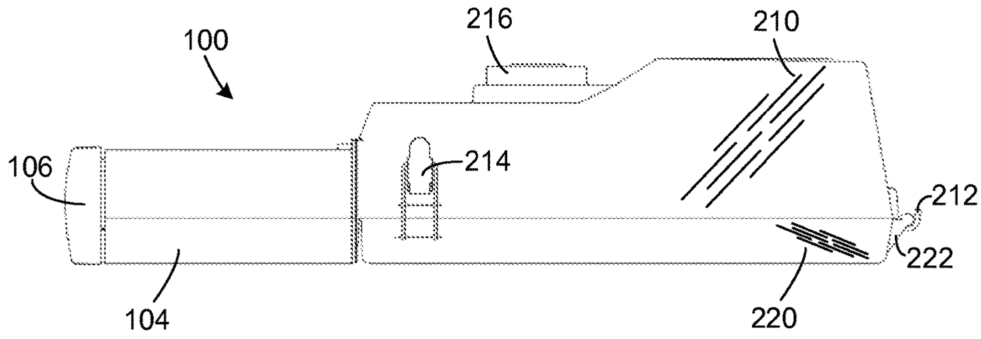
FIG. 2B provides a side view of the outdoor lighting fixture of FIG. 2A in accordance with one exemplary embodiment.

FIG. 2A provides a plan view of the lighting fixture 100 in accordance with one exemplary embodiment, and FIG. 2B provides a side view of the lighting fixture of FIG. 2A in accordance with one exemplary embodiment. Referring between FIGS. 2A and 2B, the enclosure 102 includes cabinet 210 and cover 220 portions, as illustrated. Securing clips 214 are mounted or otherwise affixed to the cabinet 210 using screws, bolts, clips, tabs, adhesives, or other suitable mechanical fastening means. The securing clips 214 secure the cover 220 to the cabinet 210. In one exemplary embodiment, the securing clips 214 are mounted on two opposing sides of the cabinet 210. The securing clips 214, in various embodiments, include hinge clips or other similar attachment means to securely hold the cover 220 physically adjacent to and against the cabinet 210, together, forming the enclosure 102. In various embodiments, the securing clips 214 are made of stainless steel or other suitable material for the application.

The cabinet 210 further includes a cover-attachment feature 212. In one exemplary embodiment, the cover-attachment feature 212 includes a hinge barrel or a partial hinge barrel, although other attachment features are within the scope and spirit of this disclosure. In the exemplary embodiment illustrated in FIGS. 2A and 2B, the cover-attachment feature 212 includes a partial hinge barrel. The cover 220 includes an attachment feature 222 formed and adapted to mechanically interface (i.e., mate) with the cover-attachment feature 212 such that, in cooperation with the securing clips 214, the cover 220 is securely held adjacent to and against the cabinet 210. When the cabinet 210 and the cover 220 are secured together using the cover-attachment feature 212, the attachment feature 222, and the securing clips 214, the enclosure 102 maintains a water tight seal against the environment for housing the power and control circuitry described above.

As illustrated in FIG. 2B, a light sensor 216 is mounted to the cabinet 210. The lighting fixture 100 is generally installed such that the light sensor 216 is positioned with a view or partial view toward the sky. The light sensor 216 detects daylight and, based on the daylight, provides one or more control signals used to determine whether to turn the light source 108 of the fixture 100 on or off. For example, when the light sensor 216 detects a sufficient or predetermined amount of daylight, it provides a control signal to turn the light source 108 off. Alternatively, when the light sensor 216 detects an insufficient amount of daylight for visibility, for example, it provides a control signal to turn the light source 108 on.

Figure 3:
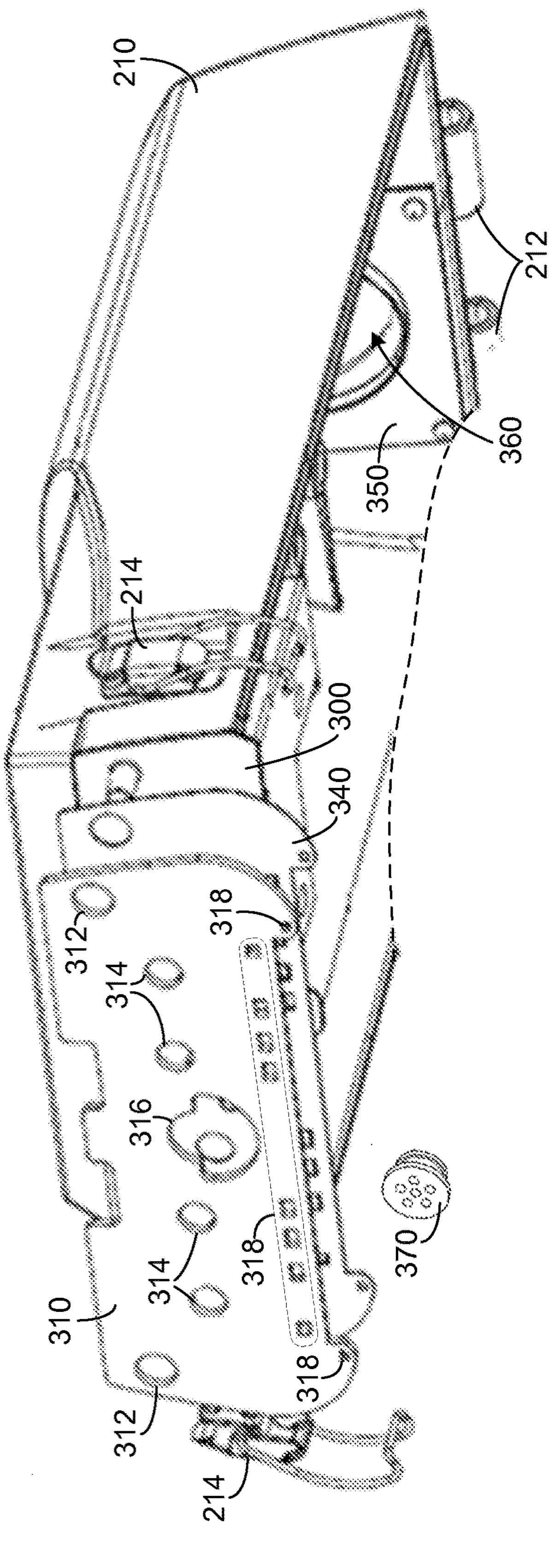
FIG. 3 provides a perspective view of a cabinet of the outdoor lighting fixture of FIGS. 2A-B in accordance with one exemplary embodiment.

FIG. 3 provides a perspective view of the cabinet 210 of the lighting fixture 100 in accordance with one exemplary embodiment. In FIG. 3, a partial view of an attachment face 300 of the cabinet 210 is illustrated. A gasket 310 and a partial view of a gasket plate 340 are also illustrated. In certain exemplary embodiments, the extruded heatsink 104 of the fixture 100 is attached at one end to the attachment face 300 of the cabinet 210, with the gasket 310 and gasket plate 340 disposed between one end of the extruded heatsink 104 and the attachment face 300. As illustrated in FIG. 3, the cabinet 210 includes a mounting feature 350 having a mounting through-hole 360 at another end. Wiring for supplying power to the lighting fixture 100 can pass through the mounting through-hole 360. In general, the mounting feature 350 and mounting through-hole 360 may take any shape or form suitable for the installation of the lighting fixture 100. FIG. 3 also illustrates a wiring plug 370, which is described in further detail below. In certain exemplary embodiments, the wiring plug 370 is formed from rubber, silicone, or another similar water-tight material.

The gasket 310 includes mounting hole openings 312, through hole openings 314, a wire pass-through opening 316, and multiple drainage openings 318. As the gasket 310 illustrated in FIG. 3 is provided as a representative example embodiment, the gasket 310 may include, in other embodiments, fewer or additional mounting hole openings, through hole openings, wire pass-through openings, or drainage openings. Additionally, the positions of the various openings, mounting holes, and through holes may vary among embodiments based on the design of the fixture 100 and, particularly, the features of the attachment face 300. The gasket plate 340 includes similar openings, mounting holes, and through holes as the gasket 310.

In general, the gasket 310 fills any open space between the extruded heatsink 104 and the gasket plate 340, creating a seal between the extruded heatsink 104 and the gasket plate 340. In various exemplary embodiments, the gasket 310 may be formed from material such as paper, rubber, silicone, metal, cork, felt, neoprene, or rubber, among other materials suitable for the purpose. In certain exemplary embodiments, the gasket 310 is formed from rubber or cork. The gasket plate 340 comprises metal such as aluminum or another rigid or semi-rigid material. As described in further detail below, it is noted that the outline (i.e., shape/size) of the attachment face 300 of the cabinet 210 is smaller than either the gasket 310, the gasket plate 340, or the end face of the extruded heatsink 104 in at least one dimension. Meanwhile, in exemplary embodiments, the size and shape of both the gasket 310 and the gasket plate 340 corresponds to the size and shape of the end face of the extruded heatsink 104. Because the outline of the attachment face 300 is smaller than the outline of the gasket 310 and the end face of the extruded heatsink 104, the gasket plate 340, which is rigid, is relied upon to compress the outer edges of the gasket 310 against the end face of the extruded heatsink 104 when the extruded heatsink 104 is mechanically secured or attached to the attachment face 300 of the cabinet 210.

Referring briefly to FIG. 6, an outline of the gasket 310 and/or the gasket plate 340 in accordance with one exemplary embodiment is illustrated. As noted above, the general outline of the gasket 310 and the gasket plate 340 are the same in one exemplary embodiment. Thus, as shown in FIG. 6, the gasket plate 340 includes mounting hole openings 342, through hole openings 344, a wire pass-through opening 346, and a multitude of drainage openings 348 corresponding, respectively, to the mounting hole openings 312, through hole openings 314, wire pass-through opening 316, and the drainage openings 318 of the gasket 310. As described above, although the gasket 310 and the gasket plate 340 share a generally similar outline, they are formed from different materials, as they serve different purposes. Specifically, the gasket 310 forms a seal between one end of the extruded heatsink 104 and the gasket plate 340, and the gasket plate 340 compresses the outer edges of the gasket 310 against the extruded heatsink 104 when the extruded heatsink 104 is mechanically secured or attached to the attachment face 300 of the cabinet 210. While the gasket 310 and the gasket plate 340 share a generally similar outline, in various embodiments, the gasket plate 340 is generally thicker than the gasket 310. Further, the gasket plate 340 is generally rigid while the gasket 310 is generally flexible, as a consequence of the composition of the material from which each is formed and the application and purpose of each.

Figure 4A:
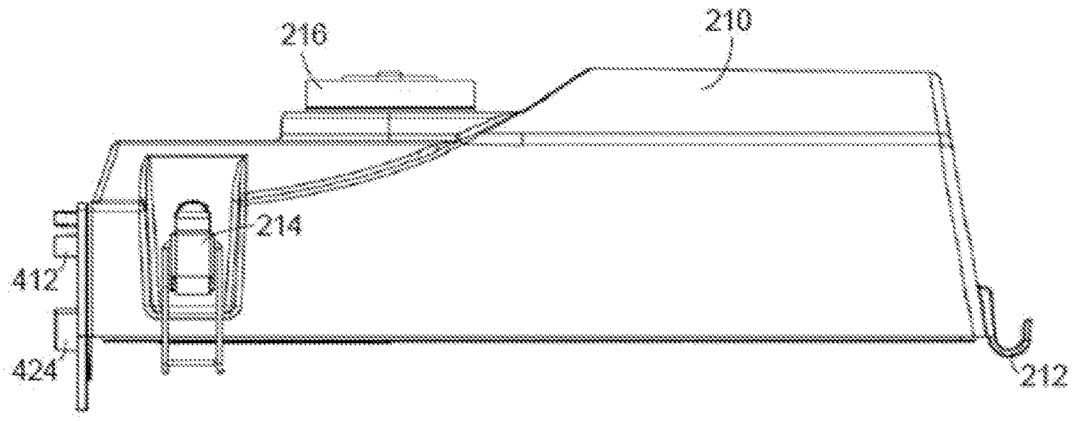
FIG. 4A provides a side view of a cabinet in accordance with one exemplary embodiment.
Figure 4B:
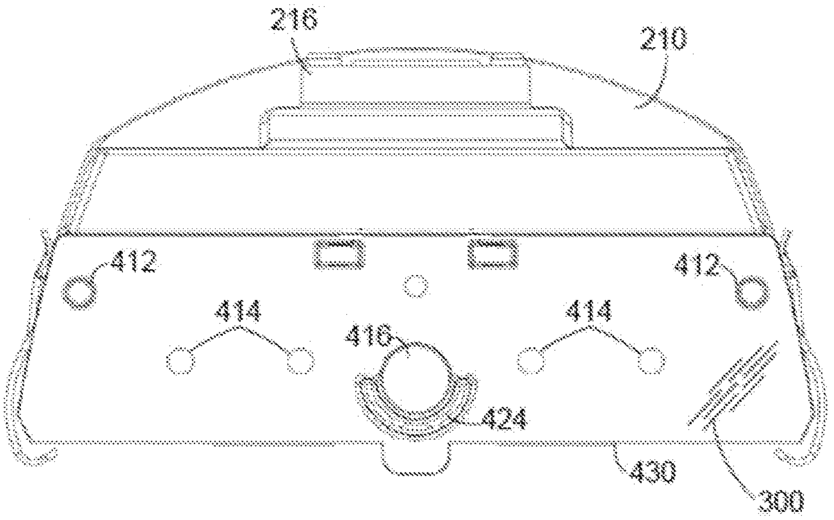
FIG. 4B provides an end view of the cabinet of FIG. 4A in accordance with one exemplary embodiment.

FIG. 4A provides a side view of the cabinet 210 in accordance with one exemplary embodiment, and FIG. 4B provides an end view of the cabinet 210 in accordance with one exemplary embodiment. Referring between FIGS. 4A and 4B, various features of the cabinet 210 and the attachment face 300 are illustrated. Particularly, the attachment face 300 includes mounting posts 412, through holes 414, a wiring pass-through opening 416, and an annular pass-through lip 424. The positions of the mounting posts 412 of the attachment face 300 correspond to positions of the mounting hole openings 312 of the gasket 310 and the mounting hole openings 342 of the gasket plate 340. In other words, when the lighting fixture 100 is assembled, the mounting posts 412 are inserted into and pass through the mounting hole openings 342 of the gasket plate 340 and the mounting hole openings 312 of the gasket plate 310. As described in further detail below with reference to FIG. 6B, the mounting posts 412 further extend into mounting post eyelets of the extruded heatsink 104, when the fixture 100 is assembled.

The extruded heatsink 104 is mounted or attached to the attachment face 300 of the cabinet 210 using screws, bolts, or other suitable mechanical fastening means that pass through the through holes 414 of the cabinet 210, the through hole openings 344 of the gasket plate 340, and the through hole openings 314 of the gasket 310. In certain exemplary embodiments, the heatsink 104 is mounted or attached to the attachment face 300 of the cabinet 210 using screws having an ISO thread and strength rating suitable for securely attaching the extruded heatsink 104 to the cabinet 210. As described in further detail below with reference to FIG. 6B, the extruded heatsink 104 includes threaded mounting eyelets for mating with the threads of the screws and attaching the extruded heatsink 104 to the cabinet 210.

The wiring plug 370 illustrated in FIG. 3 is inserted into the wiring pass-through opening 416, when the fixture 100 is assembled. As noted above, in exemplary embodiments, the wiring plug 370 is formed from rubber, silicone, or another similar water-tight material. To provide power to the light source 108 while maintaining a seal against the environment, wires for supplying power to the light source 108 are passed through holes in the wiring plug 370. The holes in the wiring plug 370 are sized to permit the wires to pass, while creating a seal against water and other environmental elements. Thus, the wiring plug 370 prevents environmental elements from entering the enclosure 102.

The annular pass-through lip 424 surrounds a portion of the wiring pass-through opening 416. During assembly, the annular pass-through lip 424, in connection with the mounting posts 412, aligns the extruded heatsink 104 to the attachment face 300. In certain embodiments, the annular pass-through lip 424 and/or the mounting posts 412 may be omitted.

Figure 5:
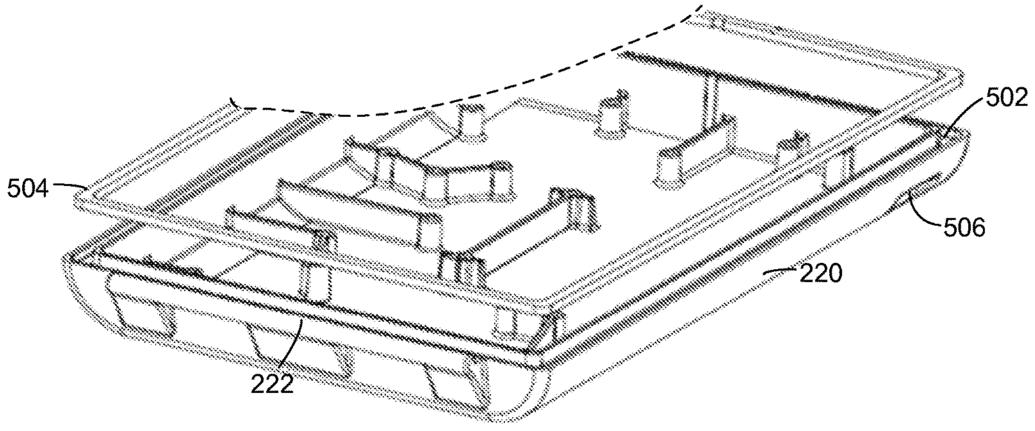
FIG. 5 provides a partial perspective view of a cover in accordance with one exemplary embodiment.

FIG. 5 provides a partial perspective view of the cover 220 of the enclosure 102 in accordance with one exemplary embodiment. The cover 220 includes the attachment feature 222 as discussed above, securing clip recesses 506, and a seal channel 502. As discussed above, when the cabinet 210 and the cover 220 are secured together using the cover-attachment feature 212, the attachment feature 222, and the securing clips 214, the enclosure 102 maintains a water tight seal against the environment as described above. The water tight seal is provided in connection with a rubber seal 504, which is disposed within the seal channel 502 when the cabinet 210 and the cover 220 are secured together. While one securing clip recess 506 is illustrated in FIG. 5, it should be appreciated that another securing clip recess 506 is formed into the cover 220 at a corresponding position on an opposite side of the cover 220. The securing clip recesses 506 are provided at locations on the cover 210 corresponding to the positions of the securing clips 214 of the cabinet 220. The securing clip recesses 506 provide recesses for the securing clips 214 to grip or secure to. The cover 220, in various embodiments, may include eyelets or other structures for mounting power and/or control circuitry within the enclosure 102, as illustrated.

Figure 6A:
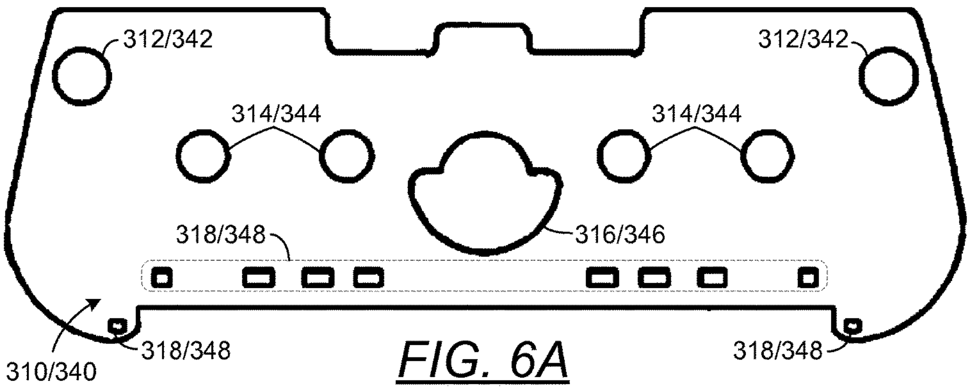
FIG. 6A provides an outline of a gasket and/or gasket plate in accordance with one exemplary embodiment.
Figure 6B:
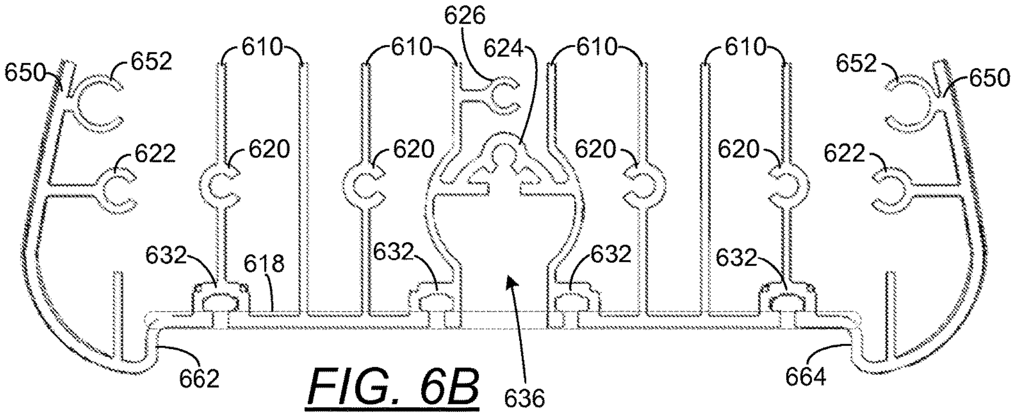
FIG. 6B provides a side view of an extruded heatsink in accordance with one exemplary embodiment.

FIG. 6B provides a side view of the extruded heatsink 104 in accordance with one exemplary embodiment. The extruded heatsink 104 may be formed from extruded aluminum as understood in the art, for example. In other embodiments, the heatsink 104 may be formed by other suitable processes rather than extrusion, such as casting, and formed from other suitable material rather than aluminum. In the exemplary embodiment of FIG. 6B, the extruded heatsink 104 includes curved sides 650 and a discontinuous plane of material 618 integrally formed with the sides 650. The discontinuous plane of material 618 is integrally formed with the sides 650 by sidewalls 662 and 664, to provide a mounting tray recessed with respect to at least one dimension of the sides 650. The mounting tray is formed in the extruded heatsink 104 to provide a tray for mounting the light source 108. As generally described herein, the mounting tray includes the discontinuous plane of material 618 and is bounded by the sidewalls 662 and 664, which help to prevent light from the light source 108 from spilling over into the sky. Thus, in certain aspects, the mounting tray and the sidewalls 662 and 664 direct light toward roadways and parking lots and away from the sky. It is noted that, in various embodiments, the sides 650 and the sidewalls 662 and 664 can be formed or extruded into alternative shapes than that illustrated in the example embodiment of FIG. 6B.

The extruded heatsink 104 further includes several heat-conducting fins 610 extending from a first side of the plane of material 618. The heat-conducting fins 610 are thermally coupled to and conduct heat away from the light source 108 to maintain the operating lifetime of the light source 108. In various exemplary embodiments, the extruded heatsink 104 may include greater or fewer heat-conducting fins 610 provided at various positions and having various sizes and shapes.

As illustrated, certain ones of the heat-conducting fins 610 include mounting eyelets 620. The mounting eyelets 620 may be threaded in certain embodiments to accept or receive screws having an ISO thread suitable for securely attaching the extruded heatsink 104 to the cabinet 210, as described above. Particularly, the screws may pass through the attachment face 300 of the cabinet 210, through both the gasket plate 340 and the gasket 310, and grip into threads tapped within the mounting eyelets 620. In certain embodiments, the sides 650 include mounting eyelets 622 similar to the mounting eyelets 620. As described above, the mounting posts 412 of the attachment face 300 extend into the mounting post eyelets 652 when the fixture 100 is assembled. The extruded heatsink 104 further includes an end-cap mounting eyelet 624. The end-cap mounting eyelet 624 includes threads in certain embodiments and is used with a screw or other coupling device to secure the end-cap 106 to the end of the extruded heatsink 104 not attached to the attachment face 300 of the cabinet 210. The extruded heatsink 104 may further include a cover mounting eyelet 626 in certain exemplary embodiments. The cover mounting eyelet 626 is provided for mounting a cover over the extruded heatsink 104, which may be desirable to prevent sand or other materials from filling spaces between the heat-conducting fins 610, especially in particularly sandy and windy environments.

In certain exemplary embodiments, the extruded heatsink 104 further includes an elongated center channel 636 and at least one elongated mounting eye opening 632. While the embodiment of the extruded heatsink 104 illustrated in FIG. 6B illustrates four elongated mounting eye openings 632, it is noted that other embodiments may include fewer or additional elongated mounting eye openings 632. It is also noted that the elongated mounting eye openings 632 may be formed in the extruded heatsink 104 at alternative locations to those illustrated in FIG. 6B and that other embodiments may include fewer or additional elongated mounting eye openings 632. In certain exemplary embodiments, the elongated center channel 636 and the elongated mounting eye openings 632 extend from one end of the extruded heatsink 104 to the other. The elongated mounting eye openings 632 are provided for mounting the light source 108 within the mounting tray in connection with threaded eyelet strips, as described in further detail below with reference to FIGS. 8 and 9. The elongated center channel 636 is generally provided as a wiring path or guide for wiring from the enclosure 102 that provides power to the light source 108. In embodiments having multiple light sources 108, several pairs of conductors may be guided within the elongated center channel 636.

Figure 6C:
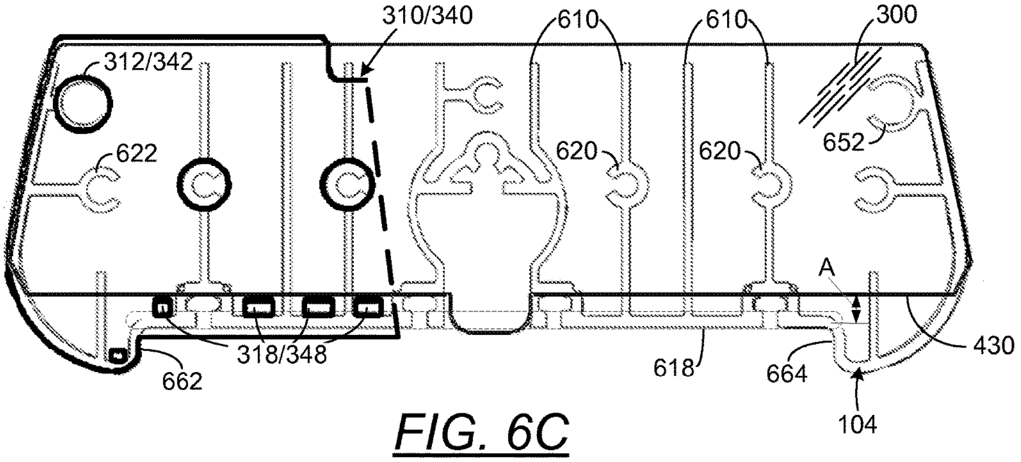
FIG. 6C provides a representative partial cutaway side view of the gasket and/or gasket plate of FIG. 6A, the extruded heatsink of FIG. 6B, and an attachment face of a cabinet in accordance with one exemplary embodiment.

FIG. 6C provides a representative partial cutaway side view of the gasket 310 and/or the gasket plate 340 of FIG. 6A, the extruded heatsink 104 of FIG. 6B, and the attachment face 300 of the cabinet 210 in accordance with one exemplary embodiment. As illustrated, the mounting hole openings 312/342 and the through hole openings 314/344 of the gasket 310 and/or the gasket plate 340 align with the mounting post eyelets 652 and the mounting eyelets 620 of the extruded heatsink 104, respectively. Additionally, as illustrated in FIG. 6C, the plurality of drainage openings 318/348 are positioned between the heat-conducting fins 610 of the extruded heatsink 104. Particularly, each of the plurality of drainage openings 318/348 is positioned between respective ones of the heat-conducting fins 610.

In connection with the overlay illustrated in FIG. 6C, when the fixture 100 is subject to the environment, any rain that collects or pools between the heat-conducting fins 610 can drain through the drainage openings 318/348. It is noted that a lateral space "A" exists between the bottom edge or surface 430 of the attachment face 300 and the discontinuous plane of material 618. Between this lateral space "A," the plurality of drainage openings 318/348 permit water that collects between the heat-conducting fins 610 to drain. In this manner, water (from rain, for example) does not collect within or between the heat-conducting fins 610, because it flows through the drainage openings 318/348 to the ground. Depending upon the angle at which the lighting fixture 100 is mounted with respect to the ground, water may also drain around the end-cap 106 from the end of the extruded heatsink 104 not attached to the attachment face 300 of the cabinet 210.

Figure 7:
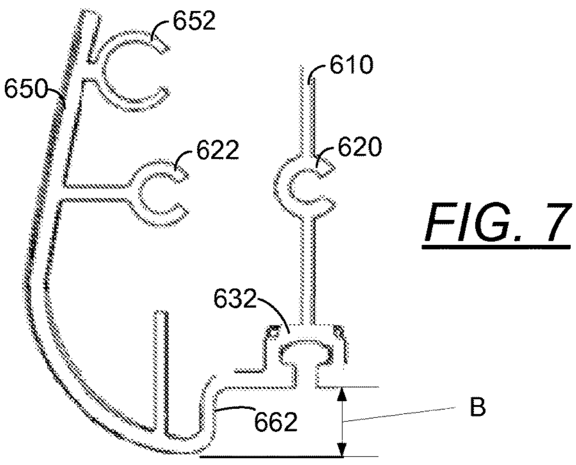
FIG. 7 provides a partial side view of an extruded heatsink including a recessed mounting tray in accordance with one exemplary embodiment.

With reference to FIG. 6C, it can be appreciated that the extruded heatsink 104 is mounted to the cabinet 210 with the sides 650 and the plane of material 618 being offset below the bottom edge or surface 430 of the attachment face 300. Referring to FIG. 7, which provides a partial side view of the extruded heatsink 104, a total distance or measurement of the offset is the sum of the space "A," measured between the bottom edge 430 of the attachment face 300 and the discontinuous plane of material 618, and the space "B," measured between the discontinuous plane of material 618 and the bottom edge of the sides 650 of the extruded heatsink 104. As identified in FIG. 7, the space "B" corresponds to the depth of the recessed mounting tray and also to the length of the sidewall 662 (and the sidewall 664). In various embodiments, the space "B" may be greater or smaller than the representative embodiment in FIG. 7.

In one aspect, the space "B" of the sidewalls 662 and 664 provides a sufficient mounting tray depth within the extruded heatsink 104 to permit the light source 108 to be recessed into the extruded heatsink 104 when mounted. In this manner, the sidewalls 662 and 664 of the mounting tray reflect light from the light source 108 downward and away from the sky. This aspect of the mounting tray substantially prevents undesirable illumination of the night sky, which interferes with the activities of the airlines, for example, and is generally attributed with waste of the light from the light source 108.

Figure 8:
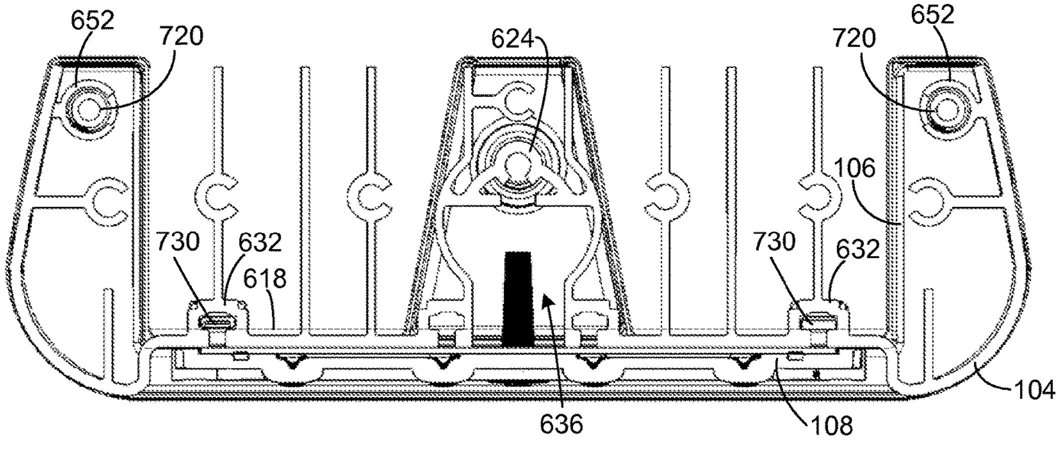
FIG. 8 provides a side view of an extruded heatsink, an end-cap, and a light source in accordance with one exemplary embodiment.
Figure 9:
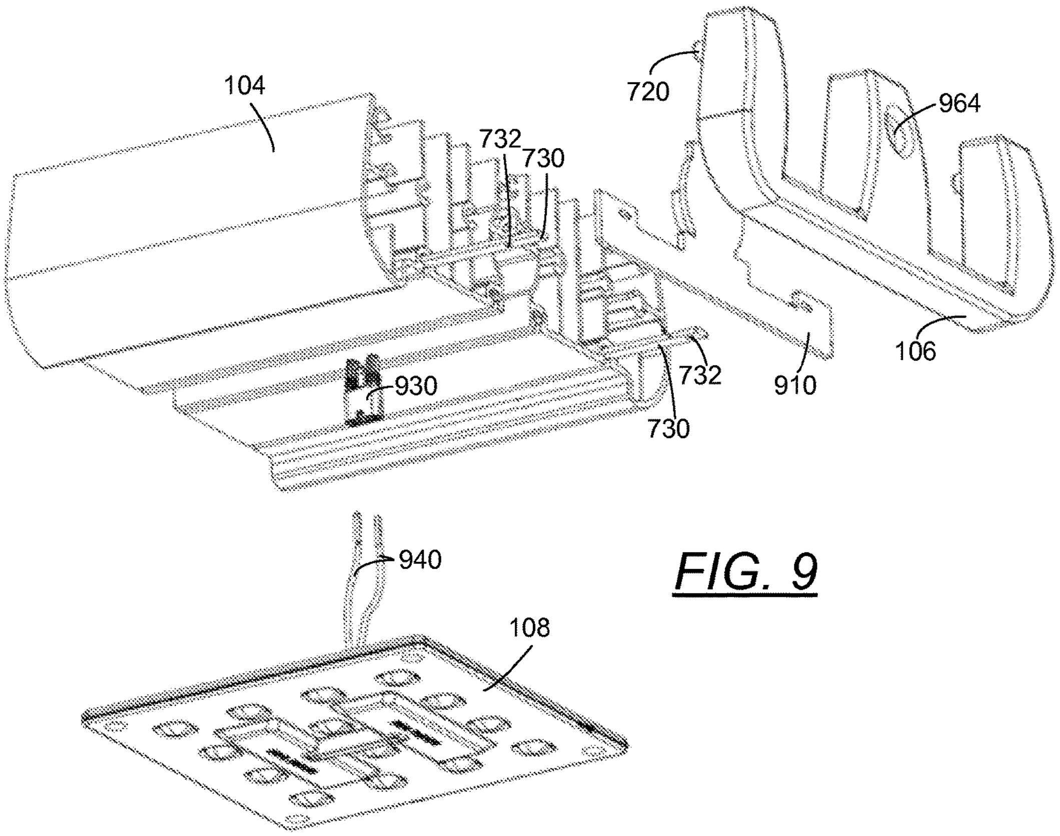
FIG. 9 provides a perspective view of the extruded heatsink, the end-cap, and the light source of FIG. 8 in accordance with one exemplary embodiment.

FIG. 8 provides a side view of the extruded heatsink 104, the end-cap 106, and the light source 108 in accordance with one exemplary embodiment. In FIG. 8, the light source is mounted to the extruded heatsink in connection with the threaded eyelet strips 730. With reference to FIG. 9, which provides a perspective view of the extruded heatsink 104, the end-cap 106, and the light source 108, insertion of the threaded eyelet strips 730 into the elongated mounting eye openings 632 is illustrated. In exemplary embodiments, the threaded eyelet strips 730 include threaded eyelets 732 tapped at certain positions corresponding to mounting through-holes of the light source 108. Before or after inserting the threaded eyelet strips 730 into the elongated mounting eye openings 632, screws are inserted through the mounting through-holes of the light source 108 and threaded into the threaded eyelets 732 of the threaded eyelet strips 730. Once the threaded eyelet strips 730 are positioned into the elongated mounting eye openings 632 of the extruded heatsink 104, the screws are tightened to secure the light source 108 to the extruded heatsink 104. Particularly, when the screws are tightened, the threaded eyelet strips 730 are securely compressed against the interior walls of the elongated mounting eye openings 632 and the light source 108 is securely compressed against the plane of material 618 forming the recessed mounting tray.

It is noted that, if one or more of the threaded eyelets 732 of the threaded eyelet strips 730 become stripped (i.e., will not catch the threads of a screw), the threaded eyelet strips 730 may be easily replaced. In this context, the use of the threaded eyelet strips 730 provides advantages over tapping threads directly into the extruded heatsink 104. Specifically, it is more difficult to re-tap threads in the extruded heatsink 104 than it is to replace a threaded eyelet strip 730. In certain cases, as would be understood by those having ordinary skill in the art, some stripped threads cannot be re-tapped. In situations such as this, it would be generally necessary to replace the entire extruded heatsink 104. However, the threaded eyelet strips 730 can be replaced, if necessary, without replacing the entire extruded heatsink 104.

Referring still to FIGS. 8 and 9, the end-cap 106 includes mounting posts 720. The mounting posts 720 of the end-cap 106 extend into the mounting post eyelets 652 of the extruded heatsink 104 when the fixture 100 is assembled. When assembled, the end-cap 106 is further secured to the extruded heatsink 104 by a screw that passes through a through hole 964 of the end-cap 106 and into the end-cap mounting eyelet 624 of the extruded heatsink 104. In certain exemplary embodiments, an end-cap plate 910 is inserted between the extruded heatsink 104 and the end-cap 106 when the lighting fixture 100 is assembled.

As discussed above, the elongated center channel 636 is provided as a wiring path or guide for wiring that provides power to the light source 108. In this context, as illustrated in the exemplary embodiment of FIG. 9, wiring leads 940 can be connected to the wiring connector 930 when the lighting fixture 100 is assembled. In certain exemplary embodiments, the wiring connector 930 is electrically coupled to power wires that extend in the elongated center channel 636, through the wiring plug 370, and into the enclosure 102. Within the enclosure, the power wires are electrically coupled to control and/or power circuitry that converts power from an external source into power suitable to illuminate the light source 108.

Figure 10:
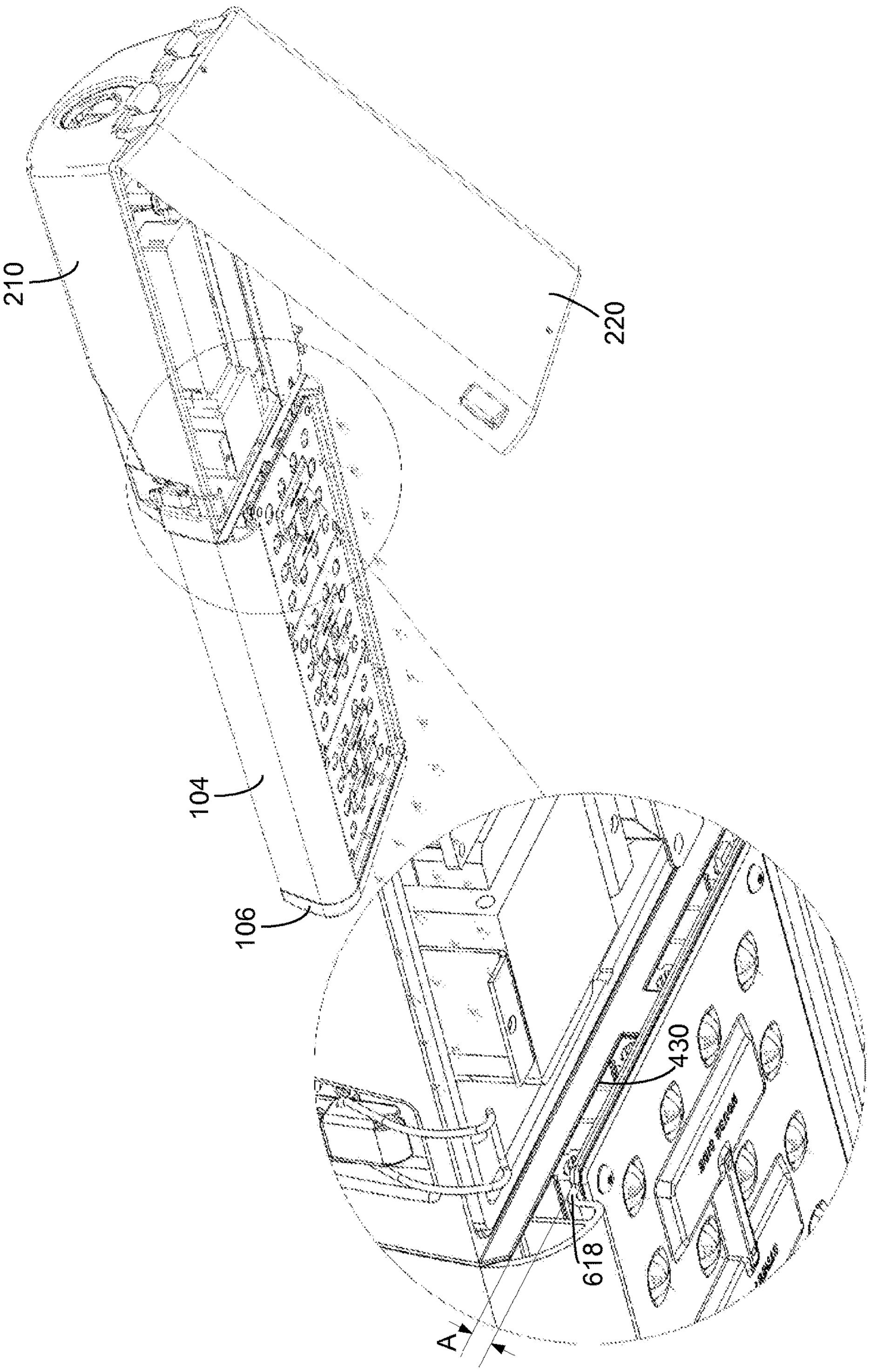
FIG. 10 provides a perspective view of a lateral space provided between an extruded heatsink and a cabinet of an enclosure in accordance with one exemplary embodiment.

FIG. 10 provides a perspective view of the lateral space "A" provided between the plane of material 618 of the extruded heatsink 104 and the bottom edge 430 of the cabinet 210 in accordance with one exemplary embodiment. In FIG. 10, it is clear that the extruded heatsink 104 is mounted or coupled to the cabinet 210 such that the extruded heatsink 104 is offset from or extends below the bottom edge 430 of the attachment face 300 of the cabinet 210 by the lateral space "A". As noted in the description above, the lateral space "A" permits any water that collects between the heat-conducting fins 610 of the extruded heatsink 104 to drain. Additionally, the lateral space "A" permits air to pass. In other words, the lateral space "A" provides a water and air outlet.

It is noted that, in the embodiment illustrated in FIG. 10, the gasket 310 and the gasket plate 340 are not mounted between the extruded heatsink 104 and the cabinet 210 of the enclosure 102. As described above, however, in certain embodiments, the gasket 310 and the gasket plate 340 are mounted or coupled between the extruded heatsink 104 and the cabinet 210. In this case, the drainage openings 318/348 of the gasket 310 and the gasket plate 340 are positioned within the lateral space "A". As such, water is able to flow through the drainage openings 318/348 of the gasket 310 and the gasket plate 340 to the ground, for example.

Figure 11:
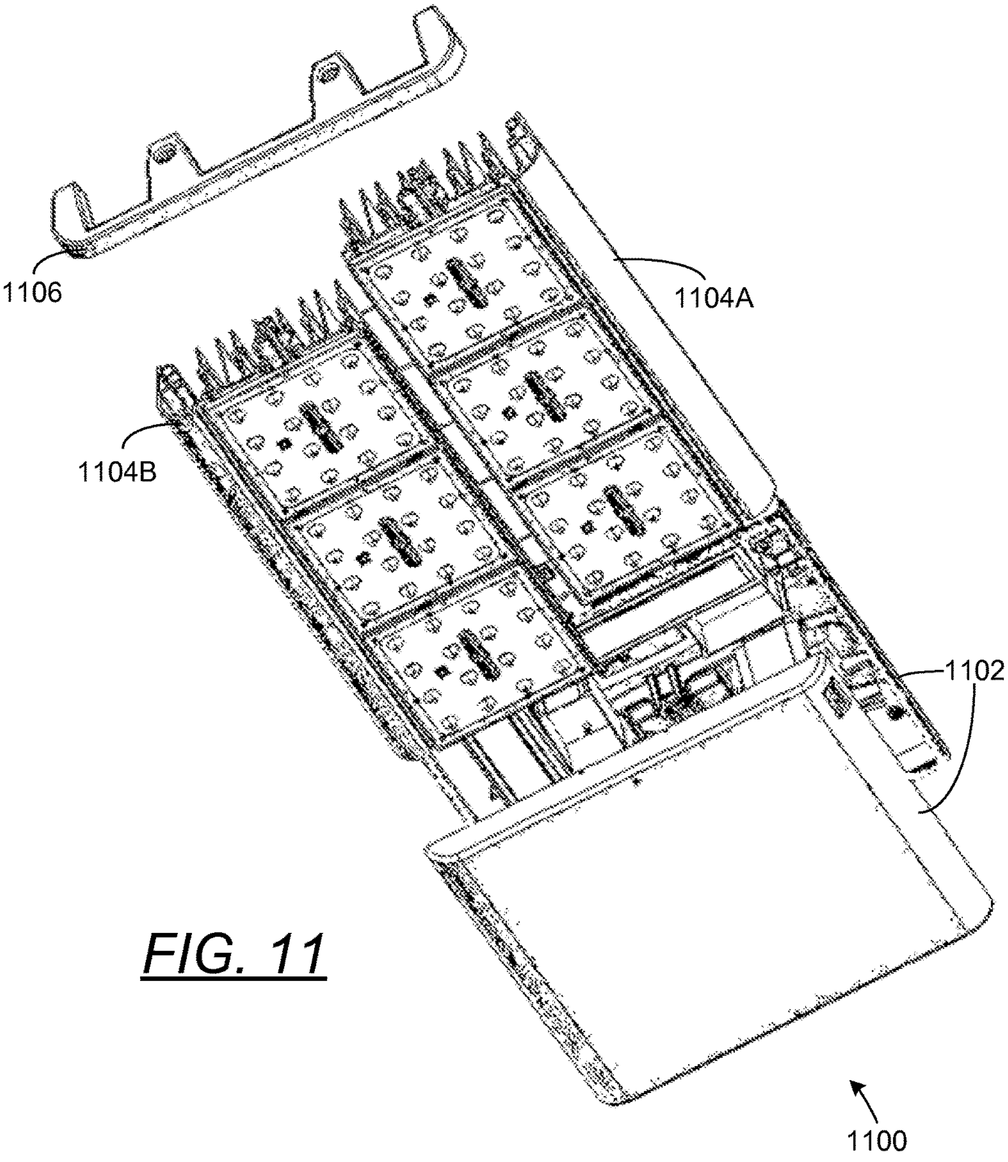
FIG. 11 provides a perspective view of another lighting fixture in accordance with other exemplary embodiments.

FIG. 11 provides a perspective view of another lighting fixture 1100 in accordance with other exemplary embodiments. In FIG. 11, the lighting fixture 1100 is similar to the lighting fixtures 100, 110, and 120, although it includes two extruded heatsink sections 1104A and 1104B. Additionally, the lighting fixture 1100 includes an enclosure 1102 that is wider than the enclosure 102 of the lighting fixture 100, for example, to accommodate the additional size of the combination of the heatsink sections 1104A and 1104B. The end-cap 1106 is also wider than the end-cap 106 of the lighting fixture 100 to accommodate the additional size of the combination of the heatsink sections 1104A and 1104B. In exemplary embodiments, certain features of the lighting fixtures 100, 110, and 120 described above are incorporated into the lighting fixture 1100, as would be understood by one having ordinary skill in the art.

Although embodiments of the present invention have been described herein in detail, the descriptions are by way of example. The features of the invention described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

What is claimed is:

1. A lighting fixture, comprising:

an enclosure comprising a cabinet having an attachment face and a cover, wherein the attachment face is disposed at a distal end of the cabinet, and wherein the cover is hingedly coupled to a bottom of the cabinet;

a heatsink coupled to the attachment face, the heatsink comprising a substantially planar mounting tray; and a light source mounted to a bottom side of the substantially planar mounting tray, wherein the heatsink comprises a bottom edge that extends below a bottom edge of the attachment face of the cabinet of the enclosure to create a lateral space, wherein the lateral space allows water that collects on the heatsink to drain therethrough, wherein the lateral space allows air to pass therethrough, and the lateral space is disposed between the heatsink and the cover.

2. The lighting fixture of claim 1, further comprising an end-cap, wherein the heatsink is coupled to the attachment face of the cabinet at a first end of the heatsink and the end-cap is coupled to a second opposing end of the heatsink.

3. The lighting fixture of claim 1, wherein the heatsink further comprises sidewalls of the substantially planar mounting tray that reflect light away from the sky.

4. The lighting fixture of claim 1, wherein the heatsink further includes an elongated center channel.

5. The lighting fixture of claim 1, wherein the substantially planar mounting tray includes at least one elongated mounting eye opening.

6. The lighting fixture of claim 5, further comprising a threaded eyelet strip disposed within the at least one elongated mounting eye opening.

7. The lighting fixture of claim 6, wherein the light source is coupled to the bottom side of the substantially planar mounting tray by the threaded eyelet strip disposed within the at least one elongated mounting eye opening.

8. The lighting fixture of claim 1, wherein the heatsink comprises two separate heatsinks each coupled to the attachment face of the cabinet.

9. The lighting fixture of claim 1, wherein the attachment face comprises a wiring pass-through, and an annular pass-through lip.

10. The lighting fixture of claim 1, further comprising a gasket disposed between the attachment face and the heat sink.

11. The lighting fixture of claim 10, wherein the gasket comprises a plurality of drainage openings, wherein each drainage opening is disposed adjacent to the heat sink and between two of a plurality of heat conducting fins of the heatsink.

12. The lighting fixture of claim 11, further comprising a gasket plate disposed between the gasket and the attachment face.

13. The lighting fixture of claim 12, wherein the gasket plate comprises a plurality of drainage openings, each drainage opening disposed generally between two of the plurality of heat conducting fins.

14. The lighting fixture of claim 1, wherein the light source comprises a light module having an array of LEDs disposed on a substrate.

15. A lighting fixture, comprising:

a cabinet comprising a plurality of sides, a top, and a bottom defining an enclosure, the cabinet comprising an attachment face that defines at least a majority of a distal side of the plurality of sides, wherein the attachment face has a first height that is less than a second height of the cabinet, wherein the first height is defined by a top edge and a bottom edge of the attachment face, and wherein the second height is defined by the top and bottom of the cabinet;

a plurality of electrical components disposed within the enclosure;

a heatsink coupled to the attachment face and comprising:

at least a first side and opposing second side;

a substantially planar mounting tray disposed between the first and second sides and integrally formed with the first and second sides; and a light module comprising an array of light emitting diode (LED) light sources coupled to the substantially planar mounting tray, wherein the heatsink is disposed such that a top surface of the substantially planar mounting tray is vertically offset below a bottom edge of the attachment face, thereby creating a lateral space, wherein the lateral space allows water that collects on the heatsink to drain therethrough, wherein the lateral space allows air to pass therethrough.

16. The lighting fixture of claim 15, wherein the substantially planar mounting tray is vertically recessed with respect to a bottom side of each of the first and second sides of the heatsink.

17. The lighting fixture of claim 16, further comprising:

a gasket coupled to and at least partially disposed between the attachment face and the heatsink; and a gasket plate coupled to the attachment face and at least partially disposed between the gasket and the attachment face, wherein each of the gasket and the gasket plate comprise a plurality of aligned drainage openings.

18. The lighting fixture of claim 17, further comprising a plurality of heatsink fins coupled to and extending up from a top surface of the substantially planar mounting tray, wherein each pair of aligned drainage openings in the gasket and gasket plate are positioned above the top surface of the substantially planar mounting tray and between pairs of adjacent ones of the plurality of heat sink fins.

19. The lighting fixture of claim 15, wherein the heatsink further includes an elongated center channel and the substantially planar mounting tray includes at least one elongated mounting eye opening.

* * * * *